United States Patent [19]

Saita et al.

[11] Patent Number: 4,561,412
[45] Date of Patent: Dec. 31, 1985

[54] IGNITION APPARATUS FOR INTERNAL COMBUSTION ENGINES

[75] Inventors: Toshikazu Saita, Kakogawa; Toshiyuki Hino, Hyogo; Masami Matsumura, Himeji, all of Japan

[73] Assignee: Mitsubishi Denki Kabushiki Kaisha, Tokyo, Japan

[21] Appl. No.: 650,111

[22] Filed: Sep. 13, 1984

[30] Foreign Application Priority Data

Sep. 17, 1983 [JP] Japan .................................. 58-171590
Nov. 15, 1983 [JP] Japan .................................. 58-216767
Dec. 27, 1983 [JP] Japan .................................. 58-246890

[51] Int. Cl.⁴ ............................................. F02P 5/04
[52] U.S. Cl. ..................................... 123/617; 123/651
[58] Field of Search ................. 123/617, 651, 625, 643

[56] References Cited

U.S. PATENT DOCUMENTS 3,564,581  1/1965  Winterbarn ......................... 123/625
3,985,109  10/1976  Kondo et al. ....................... 123/625
4,359,038  11/1982  Xiberas ............................... 123/651
4,459,968  7/1984  Brandt et al. ........................ 123/617
4,494,518  1/1985  Katayama et al. ................... 123/617

Primary Examiner—Raymond A. Nelli
Attorney, Agent, or Firm—Leydig, Voit & Mayer Ltd.

[57] ABSTRACT

An ignition apparatus for internal combustion engines for preventing input noises out of an ignition signal line from affecting the ignition timing of the engine to make knocking or a start malfunction. A bistable circuit is provided for eliminating such input noises. The bistable circuit is associated with a Schmitt circuit which serves to energize or de-energize an ignition coil for inducing a discharging voltage. The Schmitt circuit is overridden by the bistable circuit for a time interval corresponding to a time for which such input noises exist. Afterwards, the Schmitt circuit receives as an input the ignition signal synchronizing with an engine speed and controls the ignition timing.

15 Claims, 13 Drawing Figures

IGNITION APPARATUS FOR INTERNAL COMBUSTION ENGINES

BACKGROUND OF THE INVENTION

The present invention relates to an ignition apparatus for internal combustion engines, and particularly to an ignition apparatus for internal combustion engines which is capable of preventing the occurrence of erroneous operation caused by noise at the time of starting the starter motor.

FIG. 1 shows a conventional ignition apparatus for internal combustion engines, wherein the positive terminal of a DC power source 1 is connected to the collector of a power transistor 4 via a power source switch 2 which turns on or off the DC power source 1, and via the primary winding of an ignition coil 3.

A wave form processing circuit 5 operates the power transistor 4 upon receipt of a signal from a signal generator coil 6 of a signal generator which generates a signal in synchronism with the revolution of the engine.

One end of the coil 6 is grounded, and the other end thereof is connected to the base of a transistor 5b via a resistor 5a.

The transistor 5b constitutes a Schmitt circuit together with a transistor 5e. Emitters of the transistors 5b, 5e are commonly connected together and are grounded via a resistor 5h.

The collector of transistor 5b is connected to the base of transistor 5e via a resistor 5d, and is further connected to the positive terminal of the DC power source 1 via a resistor 5c and the power source switch 2.

Further, the collector of transistor 5e is connected to the positive terminal of the DC power source 1 via a resistor 5f and the power source switch 2, and is connected to the base of power transistor 4 via a resistor 5g. The emitter of power transistor 4 is grounded.

The secondary winding of the ignition coil 3 is grounded via an ignition plug 7.

FIG. 2 shows signal wave forms at each of the portions of FIG. 1.

FIG. 2(a) shows the power source voltage $V_B$ applied from the DC power source 1 to the wave form processing circuit 5, FIG. 2(b) shows the starter current $I_S$, FIG. 2(c) shows the signal voltage $V_S$ of the signal generator coil 6, FIG. 2(d) shows the output voltage $V_1$ of the transistor 5b, FIG. 2(e) shows the primary current of the ignition coil 3, i.e., it shows the collector current $I_C$ of the power transistor 4, and FIG. 2(f) shows the discharge voltage of the ignition plug 7.

The operation of the circuit in FIG. 1 will be described below. First, if the key of a car is manipulated to turn the power source switch 2 on at a moment $t_0$ shown in FIG. 2, the power source voltage $V_B$ is applied to the wave form processing circuit 5. At this moment, the transistor 5b is rendered nonconductive since the voltage $V_S$ input to the base thereof is zero, and the transistor 5e is rendered conductive, so that the output voltage $V_1$ thereof assumes a high level as shown in FIG. 2(d).

Next, if the starter motor is started near a moment $t_1$, the starter current $I_S$ rises (FIG. 2(b)). The starter current $I_S$ is of the order of several hundred amperes, has a steep wave form, and generates a considerably intense magnetic field near the cable of the starter motor. If the signal generator coil 6 is located in the region of the magnetic field, a voltage proportional to the rate of change of the starter is induced in the signal generator coil 6 as a noise voltage $V_n$ in synchronism with the starter current $I_S$.

If the noise voltage $V_n$ exceeds the turn-on voltage $V_{on}$ of the transistor 5b in the wave form processing circuit 5, i.e., in the prestage of the Schmitt circuit, the Schmitt circuit is triggered.

That is, the transistor 5b is turned on at a moment $t_1$ in FIG. 2, and the output voltage $V_1$ assumes a low level. Therefore, the transistor 5e is turned off, the power transistor 4 which serves as a switching element is turned on, and a collector current $I_n$ flows.

As the noise voltage $V_n$ decreases and becomes lower than the turn-off voltage $V_{off}$ of the transistor 5b at, for example, a moment $t_2$, the transistor 5b is turned off again, and the output voltage $V_1$ thereof assumes a high level. Therefore, the transistor 5e is turned on, the power transistor 4 is turned off, the collector current $I_n$ is interrupted at the moment $t_2$, and a discharge voltage $V_g$ appears at the ignition plug 7.

As the starter current $I_S$ is supplied, the starter turns the engine with its output torque, and a first normal signal $V_S$ is generated in the signal generator coil 6 near a moment $t_3$. Every time the signal voltage $V_S$ crosses the turn-on voltage $V_{on}$ and the turn-off voltage $V_{off}$ of the transistor 5b, the transistors perform the same operations as those mentioned with reference to the moments $t_1$ and $t_2$. That is, the collector current $I_C$ is permitted to flow at the moments $t_3$, $t_5$, and $t_7$, and is interrupted at the moments $t_4$, $t_6$ and $t_8$, so that spark discharge takes place normally at the ignition plug 7.

According to the conventional ignition apparatus for internal combustion engines as described above, the wave form processing circuit 5 is erroneously operated and the spark discharge takes place at the ignition plug 7 at the moment $t_2$ which is earlier than the normal moment $t_4$ of ignition, in case noise voltage $V_n$ is induced in the signal generator coil 6 due to the magnetic field established by the starter current $I_S$. Therefore, a counter torque is generated in the engine, making it difficult to start the engine.

To eliminate this drawback, it has heretofore been attempted to place the cable in which the starter current flows remote from the signal generator 6. This sort of arrangement, however, is often restricted by the requirements of the layout of various cables.

As other prior art, Japanese patent application Laid-Open No. 53-49638 (published on May 6, 1978) discloses an ignition apparatus for internal combustion engines, according to which the flow of current to the ignition coil is inhibited by forcibly turning on the input transistor for a predetermined period of time at the time of starting the engine, so that the transistor will not respond to noise that enters during that period. Further, Japanese patent application Laid-Open No. 52-87536 (published on July 21, 1977) discloses a selective threshold ignition circuit according to which the DC threshold level is changed at the time of starting or the running of a car, in order to improve noise-resistant performance during the period of running.

SUMMARY OF THE INVENTION

Accordingly, it is an object of the invention to provide an ignition apparatus for internal combustion engines without erroneous ignitions due to noises produced together with a starter current.

In order to achieve this object, the present invention has been made to eliminate a malfunction of an ignition apparatus for internal combustion engines by means of a bistable circuit which receives a power source voltage and an ignition signal voltage or a processed voltage of the signal voltage to override a process circuit for the ignition signal to maintain an ignition coil in its deenergized condition at least until such starter noises are extinguished.

In one aspect of the present invention, the present invention provides an ignition apparatus for internal combustion engines comprising: means for generating an ignition signal synchronizing with an engine speed; a circuit, formed of first and second amplifying stages, for processing the wave form of the output signal of the ignition signal generating means; a switching circuit drived by the output signal of the second stage of the wave form processing circuit to induce a discharging voltage across an ignition coil; a DC power source for supplying power to the wave form processing circuit and the switching circuit; and, a bistable means set by the DC power source voltage and reset by the output of the first stage of the wave form processing circuit, the bistable means holding the reset state and controlling the second stage so as not to induce the discharging voltage across the ignition coil, at least during the time interval of the set and reset operations.

In another aspect of the present invention, there is provided an ignition appratus for internal combustion engines comprising: means for generating an ignition signal synchronizing with an engine speed; a circuit, formed of first and second amplifying stages, for processing the wave form of the output signal of the ignition signal generating means; a switching circuit drived by the output signal of the second stage of the wave form processing circuit to induce a discharging voltage across an ignition coil; a DC power source for supplying power to the wave form processing circuit and the switching circuit; and, a bistable means set by the first one of output signals of the first stage of the wave form processing circuit and reset by any one of the subsequent output signals of the first stage, the bistable means including means for holding the reset stage and controlling the second stage of the wave form processing circuit so as not to induce the discharging voltage across the ignition coil, at least during the time interval of the set and reset operations.

In still another espect of the present invention, a timer circuit is further provided for timing a predetermined time interval, from the moment of the application of a power source voltage, for which the bistable circuit is not reset. This ascertains the required operation of the bistable circuit even though a power switch makes chattering.

BRIEF DESCRIPTION OF THE DRAWINGS

In the drawings, the same reference numerals represent the same or corresponding portions.

DETAILED DESCRIPTION OF THE PREFERRED EMBODIMENTS

Preferred embodiments of the ignition apparatus for internal combustion engines of the present invention will be described below in detail in conjunction with the drawings.

Figure 1:
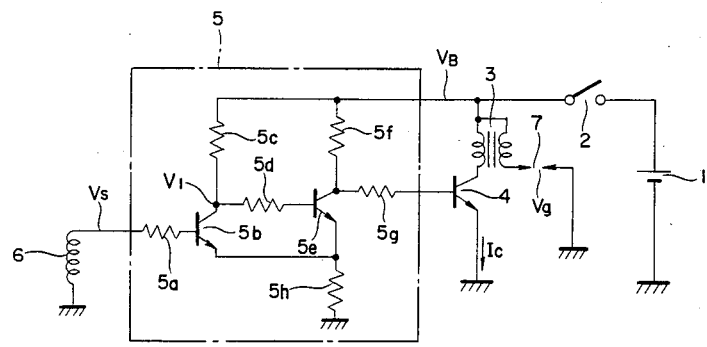
FIG. 1 is a circuit diagram of a conventional ignition apparatus for internal combustion engines.
Figure 3:
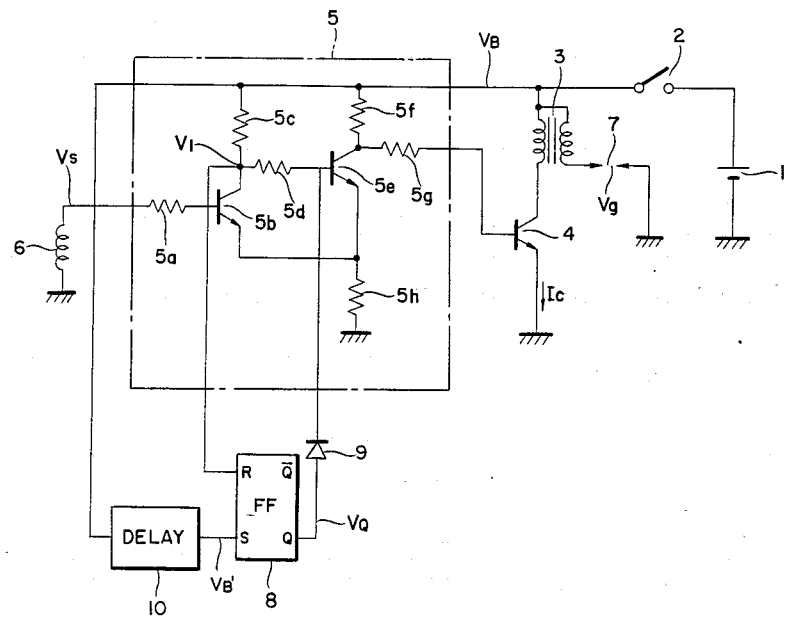
FIG. 3 is a circuit diagram of an ignition apparatus for internal combustion engines according to an embodiment of the present invention.

FIG. 3 is a circuit diagram showing the construction of a first embodiment of the present invention, wherein the same portions as those of FIG. 1 are denoted by the same reference numerals, and their description is not repeated here, but the portions different from those of FIG. 1 are mentioned below.

As will be obvious from the comparison of FIG. 3 with FIG. 1, the portions denoted by reference numerals 1 to 7 of FIG. 3 are the same as those of FIG. 1, and the portions denoted by 8 and subsequent numerals are newly added ones.

The circuit structure of FIG. 1 is newly provided with portions denoted by reference numerals 8 to 10. A flip-flop circuit 8 receives the power source voltage $V_B$ and the signal voltage $V_S$ or a processed voltage $V_1$ thereof that are applied to the wave form processing circuit 5. The flip-flop circuit 8 does not energize the ignition coil over a period of at least from when it is set once to when it is reset. Therefore, the flip-flop circuit 8 is used as a circuit having a memory function.

The set terminal S of flip-flop circuit 8 is connected to the output terminal of a delay circuit 10, and the input terminal of the delay circuit 10 is connected to the positive terminal of the DC power source 1 via the power source switch 2.

The reset input terminal R of flip-flop circuit 8 is connected to the collector of transistor 5b, and the output terminal Q thereof is connected to the base of transistor 5e via a diode 9. The flip-flop circuit 8 shown in FIG. 3 is called an edge triggered-type R-S flip-flop circuit. When a signal having a high level is input to the input terminal S, the flip-flop circuit 8 detects it as an effective signal only during a rising moment thereof, and produces a signal having a high level from the output terminal Q. When a signal having a high level is input to the reset input terminal R, the flip-flop circuit produces a signal having a low level from the output terminal Q.

The power source voltage $V_B$ is slightly delayed by the delay circuit 10, and the thus delayed voltage $V_B'$ is input to the set input terminal S of the flip-flop circuit 8. To the reset input terminal R is applied a voltage $V_1$ produced by the transistor 5b. A signal produced from the output terminal Q is input to the base of the transistor 5e via a diode.

The delay circuit 10 causes the set input signal input to the flip-flop circuit 8 to be delayed behind the reset input signal, so that the flip-flop circuit is maintained in a set condition subsequent to a reset condition until noise enters and is then caused to operate.

Operation of the thus constructed ignition apparatus for internal combustion engines of the invention will be described below with reference to FIG. 4, which is a time chart.

FIG. 4(a) shows the power source voltage $V_B$ applied to the signal processing circuit 5, FIG. 4(b) shows the voltage $V_B'$ produced by the delay circuit 10, FIG. 4(c) shows the starter current $I_S$, FIG. 4(d) shows the signal voltage $V_S$ of the signal coil 6, FIG. 4(e) shows the voltage $V_1$ produced by the transistor 5b, FIG. 4(f) shows the output voltage $V_Q$ of the flip-flop circuit 8, FIG. 4(g) shows the collector current $I_C$ of the power transistor 4, and FIG. 4(h) shows the discharge voltage $V_g$ which develops at the ignition plug 7.

First, if the power supply switch 2 is closed at a moment $t_0$, the power source voltage $V_B$ is applied to the wave form processing circuit 5. In this case, the voltage $V_S$ applied to the base of transistor 5b is still zero volts. Therefore, transistor 5b remains nonconductive and produces an output voltage $V_1$ having a high level which is input to the reset input terminal R of the flip-flop circuit 8. The flip-flop circuit 8 therefore produces an output $V_Q$ having a low level.

At a moment $t_0'$ slightly after the moment $t_0$, the voltage $V_B'$ is input from the output terminal of the delay circuit 10 to the set input terminal S of the flip-flop circuit 8. Then, the level of output $V_Q$ of the flip-flop circuit 8 is inverted to the high level, and a base current is supplied to transistor 5e via the diode 9.

Next, a starter current $I_S$ commences to flow near a moment $t_1$, a noise voltage $V_n$ is inevitably contained in the signal voltage $V_S$. As the noise voltage $V_n$ exceeds the turn-on voltage $V_{on}$ of transistor 5b at the moment $t_1$, transistor 5b is rendered conductive.

Therefore, the output voltage $V_1$ drops to a low level. Transistor 5e, however, is maintained conductive since it is provided with a base current, i.e., it is provided with the output $V_Q$ from the flip-flop circuit 8.

Figure 2:
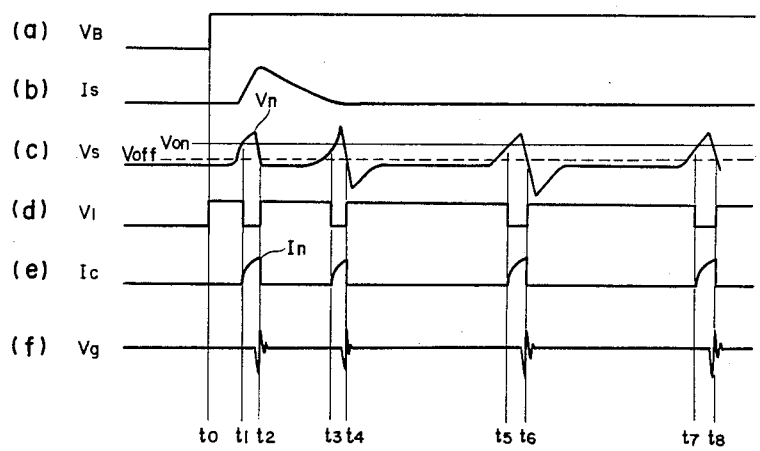
FIG. 2 is a diagram of wave forms for illustrating the operation of the ignition apparatus for internal combustion engines of FIG. 1.

Therefore, the power transistor 4 remains nonconductive, and collector current $I_n$ (dotted line) shown in FIG. 2 caused by noise voltage $V_n$ does not flow.

Next, as the noise voltage $V_n$ becomes smaller than the turn-off voltage $V_{off}$ at a moment $t_2$, transistor 5b is rendered nonconductive again, and its output voltage $V_1$ is input to the reset input terminal R of the flip-flop circuit 8. Therefore, the output $V_Q$ of the flip-flop circuit 8 assumes a low level.

The transistor 5e is no longer provided with the base current from the flip-flop circuit 8 but instead is provided with a base current from the output voltage $V_1$ of transistor 5b. Transistor 5e therefore is maintained conductive, and the power transistor 4 is maintained nonconductive.

Next, as the engine starts to run, a normal signal voltage $V_S$ generates in the signal generator coil 6. If now the signal voltage $V_S$ exceeds the above-mentioned turn-on voltage $V_{on}$ at a moment $t_3$, transistor 5b is rendered conductive, and the output voltage $V_1$ thereof drops to the low level. Since the output voltage $V_Q$ of the flip-flop circuit 8 is not maintaining a high level, transistor 5e is rendered nonconductive as the transistor 5b is rendered conductive, and the power transistor 4 is rendered conductive.

Therefore, the collector current $I_C$ of the transistor 4 starts to flow, and energy builds up in the ignition coil 3.

Then, as the signal voltage $V_S$ becomes lower than the turn-off voltage $V_{off}$ at a moment $t_4$ which is a predetermined ignition time of the engine according to ignition signal $V_S$ transistor 5b is rendered nonconductive again and transistor 5e is rendered conductive. Therefore, the power transistor 4 is rendered nonconductive, the collector current $I_C$ is interrupted, a high voltage is induced on the secondary side of the ignition coil 3, and a discharge voltage $V_g$ is applied to the ignition plug 7, so that ignition takes place.

Figure 4:
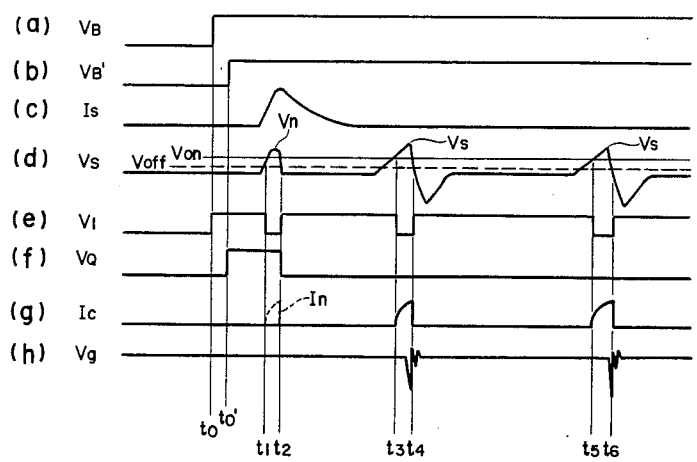
FIG. 4 is a diagram of wave forms for illustrating the operation of the ignition apparatus for internal combustion engines of FIG. 3.

The same operation is repeated at subsequent moments $t_5$, $t_6$ in FIG. 4.

Figure 5:
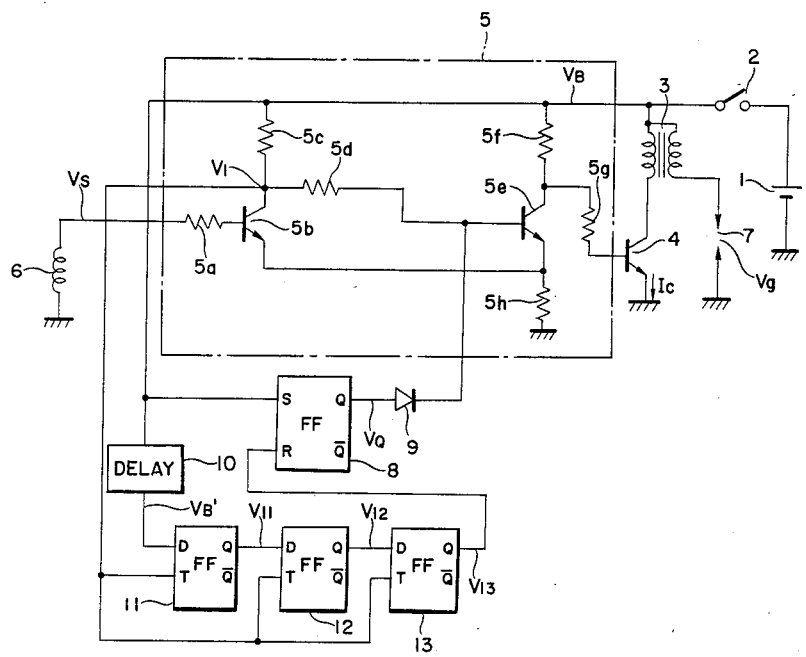
FIG. 5 is a circuit diagram of an ignition apparatus for internal combustion engines according to a second embodiment of the present invention.

A second embodiment will be described below in conjunction with the circuit diagram in FIG. 5. In FIG. 5, so-called edge-triggered D-type flip-flop circuit designated by reference numerals 11 to 13 are newly added to the construction of FIG. 3.

The flip-flop circuits 11 to 13 are connected in cascade. The input terminal D of flip-flop circuit 11 is connected to the output terminal of delay circuit 10. The output terminal Q of flip-flop circuit 11 is connected to the input terminal D of flip-flop circuit 12. The output terminal Q of flip-flop circuit 12 is connected to the input terminal D of flip-flop circuit 13, and the output terminal Q of flip-flop circuit 13 connected to the reset input terminal R of flip-flop circuit 8.

Trigger terminals T of flip-flop circuits 11 to 13 are connected to the collector of transistor 5b. The set input terminal S of flip-flop circuit 8 and the input terminal of delay circuit 10 are connected to the positive terminal of the DC power source 1 via the power source switch 2. The structure is the same as that of FIG. 3 in other respects.

Figure 6:
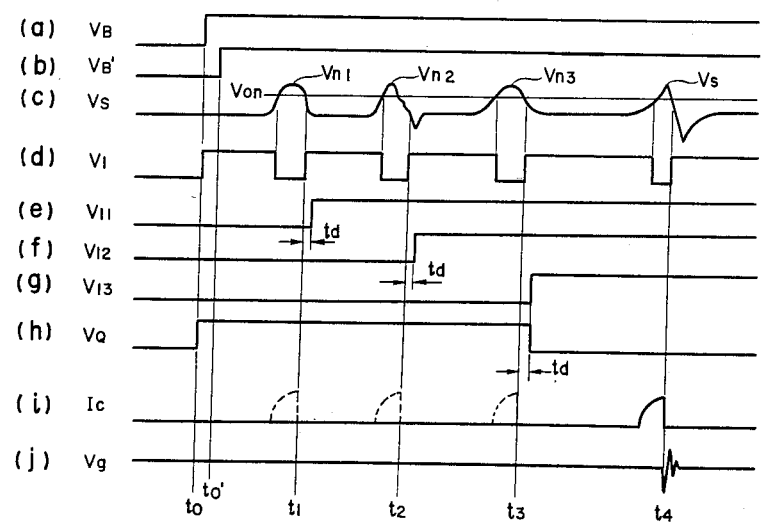
FIG. 6 is a diagram of wave forms for illustrating the operation of the ignition apparatus for internal combustion engines of FIG. 5.

FIG. 6 shows wave forms of voltages and currents at each of the portions of the circuit of FIG. 5. FIG. 6(a) shows the power source voltage $V_B$ applied to the signal processing circuit 5, FIG. 6(b) shows the output voltage $V_B'$ of the delay circuit 10, FIG. 6(c) shows a signal voltage $V_S$, FIG. 6(d) shows the output voltage $V_1$ of transistor 5b, and FIGS. 6(e) to 6(g) show output voltages $V_{11}$ to $V_{13}$ of flip-flop circuits 11 to 13. FIG. 6(h) shows the output voltage $V_Q$ of the flip-flop circuit 8, FIG. 6(i) shows the collector current $I_C$ of the power transistor 4, and FIG. 6(j) shows the discharge voltage $V_g$ of the plug 7.

If the power source switch 2 is closed at the moment $t_0$, the power source voltage $V_B$ is applied to the whole circuit, whereby transistor 5b produces an output voltage $V_1$ having a high level in the same manner as mentioned earlier, the flip-flop circuit is set by the power source voltage $V_B$ and the output voltage $V_Q$ thereof assumes a high level. Therefore, transistor 5e is also provided with a base current from the flip-flop circuit 8 via the diode 9. At a slightly delayed moment $t_0'$, the delay circuit 10 produces the output $V_B'$ having a high level.

Mentioned below is the case where the engine is rotated, and a plurality of noise signals $Vn_1$ to $Vn_3$ are input to the base of transistor 5$b$ as shown in FIG. 6($c$) before a normal ignition signal $V_S$ is input to the signal generator coil 6. Here, the flip-flop circuit 11 is triggered at a moment $t_1$ by the rising edge of voltage $V_1$, and the output voltage $V_{11}$ thereof assumes a high level at a moment $t_d$ that is slightly delayed.

At subsequent moments $t_2$ and $t_3$ as well the flip-flop circuits 12 ad 13 are triggered successively, and the output voltages $V_{12}$ and $V_{13}$ assume a high level successively. As the final output voltage $V_{13}$ assumes a high level, the flip-flop circuit 8 is reset and the output voltage $V_Q$ thereof assumes a low level. Therefore, transistor 5$e$ is controlled solely by the output voltage $V_1$ of the transistor 5$b$.

Accordingly, a normal signal $V_S$ that enters at a subsequent moment $t_4$ renders transistor 5$b$ conductive, transistor 5$e$ nonconductive, and transistor 4 conductive, so that the collector current $I_C$ of the power transistor 4 is permitted to flow. Then, normal operation is resumed in the same manner as described earlier.

In the embodiment of FIG. 5 where three noise signals Vn are input, use is made of three flip-flop circuits 11 to 13. The above-mentioned object can be accomplished if use is made of flip-flop circuits equal in number to the number of noise signal Vn.

A third embodiment of the invention will be described below in conjunction with the circuit diagram in FIG. 7.

Figure 7:
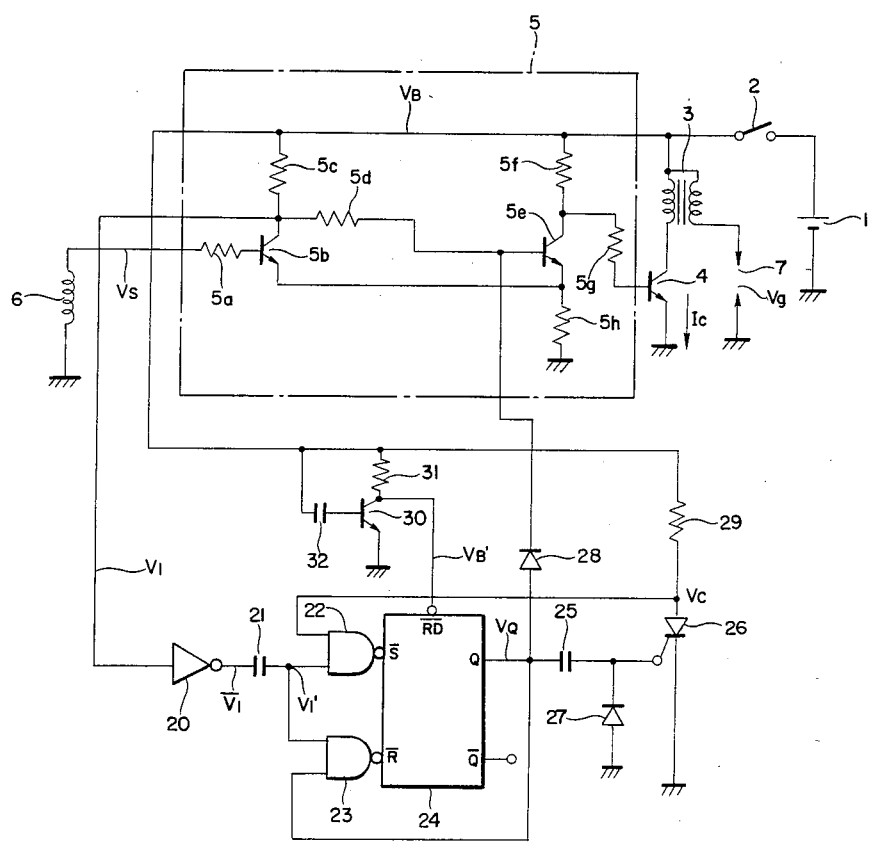
FIG. 7 is a circuit diagram of an ignition apparatus for internal combustion engines according to a third embodiment of the present invention.

In FIG. 7, an inverter 20 receives a signal $V_1$ from the transistor 5$b$, and produces a voltage $\overline{V}_1$ of which the polarity is inverted. The voltage $\overline{V}_1$ is differentiated by a capacitor 21 to form a voltage $V_1'$.

The capacitor 21 is connected to input terminals on one side of two NAND gates 22 and 23 which are connected to input terminals $\overline{S}$ and $\overline{R}$ of a flip-flop circuit 24. The flip-flop circuit 24 is triggered when a signal having a low level is input to the input terminal $\overline{R}$ or $\overline{S}$. The output terminal Q of the flip-flop circuit 24 is connected to the gate terminal of a thyristor 26 via a capacitor 25. The cathode of thyristor 26 is grounded, and a diode 27 is connected between the gate and cathode thereof. Further, the output terminal Q of the flip-flop 24 is connected to another input terminal of the NAND gate 23, and is further connected to the base of the transistor 5$e$ via a diode 28. The anode of the thyristor 26 is connected to the positive pole of the DC power source 1 via a resistor 29 and power source switch 2, and is further connected to another input terminal of the NAND gate 22. Another reset input terminal $\overline{RD}$ of the flip-flop circuit 25 is connected to a point where a transistor 30 and a resistor 31 are connected together, the base of transistor 30 being connected to the power source switch 2 via a capacitor 32. The flip-flop circuit 24 is reset when a signal of the low level is input to the reset input terminal $\overline{RD}$ thereof.

Figure 8:
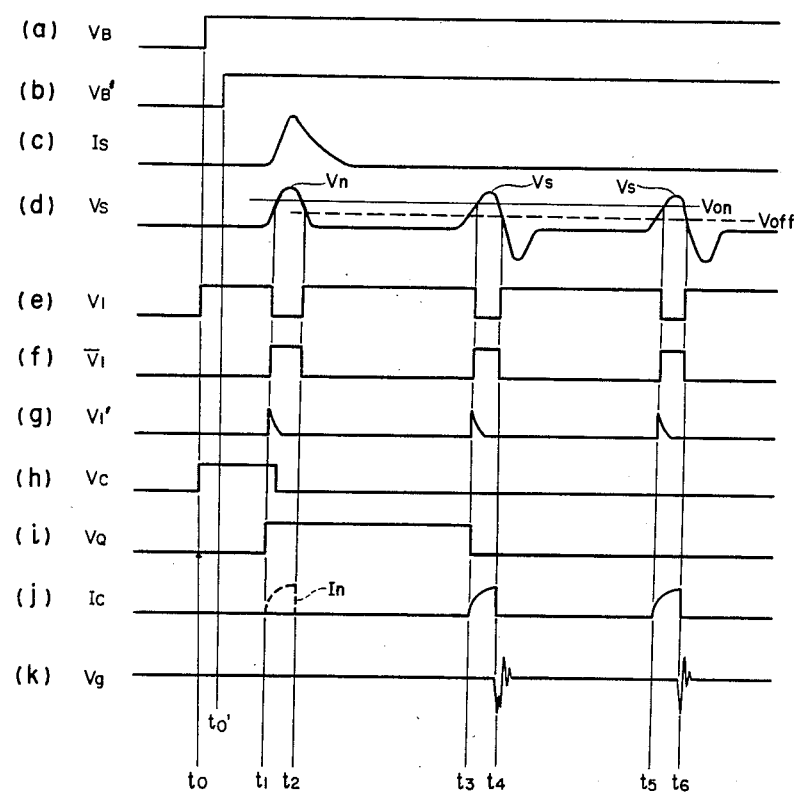
FIG. 8 is a diagram of wave forms for illustrating the operation of the ignition apparatus for internal combustion engines of FIG. 7.

FIG. 8 shows wave forms of voltages and currents at each of the portions of the circuit of FIG. 7. FIG. 8($a$) shows the power source voltage $V_B$ applied to the signal processing circuit 5, FIG. 8($b$) shows the output voltage $V_B'$ of the transistor 30, FIG. 8($c$) shows the starter current $I_S$, FIG. 8($d$) shows the signal voltage $V_S$, FIG. 8($e$) shows the output voltage $V_1$ of the transistor 5$b$, FIG. 8($f$) shows the output voltage $\overline{V}_1$ of the inverter 20, FIG. 8($g$) shows the differentiated output voltage $V_1'$ of the capacitor 21, FIG. 8($h$) shows the anode voltage $V_C$ of the thyristor 26, FIG. 8($i$) shows the output voltage $V_Q$ of the flip-flop circuit 24, FIG. 8($j$) shows the collector current $I_C$ of the transistor 4, and FIG. 8($k$) shows the wave form of discharge voltage Vg of the plug 7.

Operation of the circuit in FIG. 8 will be described below. First, if the power source switch 2 is closed at a moment $t_0$, the power source voltage $V_B$ is applied to the whole circuit. Immediately thereafter as shown in FIG. 8, the voltage $V_B'$ assumes a low level since the transistor 30 is biased in the forward direction via the capacitor 32 and is rendered conductive. Therefore, the reset terminal $\overline{RD}$ assumes a low level, the flip-flop circuit 24 is reset, the voltage $V_Q$ assumes a low level, and the voltage $V_1$ assumes a high level as mentioned above. Accordingly, the voltage $\overline{V}_1$ assumes a low level, the voltage $V_Q$ assumes a low level, the thyristor 26 is not triggered, and the voltage $V_C$ assumes a high level.

After a small period of time has passed, i.e., at a moment $t_0'$, the transistor 30 is rendered nonconductive, and the voltage $V_B'$ assumes a high level.

Then, the starter current $I_S$ starts to flow nearly at a moment $t_1$. A noise voltage Vn is contained in the signal voltage $V_S$ as mentioned earlier. If the noise voltage Vn exceeds the turn-on voltage Von of the transistor 5$b$ at the moment $t_1$, the transistor 5$b$ is rendered conductive. Therefore, the output voltage $V_1$ assumes a low level. However, since the inverted voltage $\overline{V}_1$ assumes a high level as mentioned earlier, the rising edge thereof is differentiated by the capacitor 21, and an output voltage $V_1'$ is obtained.

Since the voltage $V_C$ has a high level, the NAND gate 22 remains open, the differentiated output voltage $V_1'$ is input to the set input terminals $\overline{S}$ of the flip-flop circuit 24, and the flip-flop circuit 24 is thereby set and its output voltage $V_Q$ assumes a high level.

As the output voltage $V_Q$ assumes a high level, the following three functions are performed simultaneously: (1) the NAND gate 23 is opened, (2) the thyristor 26 is triggered, and (3) the transistor 5$e$ is rendered conductive.

When the thyristor 26 is triggered, the voltage $V_C$ drops to a low level, and the NAND gate 22 is closed. Even when the transistor 5$b$ remains conductive, the power transistor 4 remains nonconductive if the transistor 5$e$ is rendered conductive, and the collector current In (dotted line) does not flow responsive to noise voltage Vn.

Next, as the noise voltage Vn becomes lower than the turn-off voltage Voff at the moment $t_2$, the transistor 5$b$ is rendered nonconductive again, and the output voltage $V_1$ thereof assumes a high level.

Next, as the engine starts to run, a normal signal voltage $V_S$ is produced by the signal generator coil 6. Here, if the signal voltage $V_S$ exceeds the turn-on voltage Von at the moment $t_3$, the transistor 5$b$ is rendered conductive, and the output voltage $V_1$ thereof drops to a low level.

Then, the voltage $V_1'$ differentiated by the capacitor 32 is input again to the NAND gates 22 and 23. As mentioned above, however, one NAND gate 22 remains closed, and the other NAND gate 23 remains open. Therefore, the differentiated voltage $V_1'$ is input as reset input to the flip-flop circuit 24, and hence its output voltage $V_Q$ is inverted to assume a low level.

Change in the output voltage $V_Q$ causes the electric charge stored in the capacitor 25 to be discharged via the diode 27. However, since the thyristor 26 is maintained conductive, the NAND gate 22 is maintained closed. On the other hand, as the output voltage $V_Q$ assumes a low level, the diode 28 interrupts the flow of base current to the transistor 5e; i.e., the transistor 5e is rendered nonconductive at the moment $t_3$. Therefore, the transistor is rendered conductive, the collector current $I_C$ thereof starts to flow, and energy builds up in the ignition coil 3.

Next, at a moment $t_4$ which is a predetermined ignition timing of the engine, if the signal voltage $V_S$ becomes lower than the turn-off voltage Voff, the transistor 5b is rendered nonconductive again, and the transistor 5e is rendered conductive. Therefore, the power transistor 4 is rendered nonconductive, the collector current $I_C$ is interrupted, a high voltage is induced on the secondary side of the ignition coil 3, and a discharge voltage Vg appears at the ignition plug 7 to produce ignition.

The flip-flop circuit 24 is reset at the moment $t_3$ as mentioned earlier, and the output voltage $V_Q$ thereof assuming a low level is input to the NAND gate 23. Therefore, the NAND gate 23 is closed.

Therefore, after the moment $t_3$ has passed, both the NAND gates 22 and 23 are maintained in a closed state. Accordingly, even if a trigger voltage $V_1'$ is input, the flip-flop circuit 24 remains inoperative. This is because, as will be obvious from the foregoing description, operation of the transistor 5e is not controlled by the flip-flop circuit 24, but is controlled solely by the transistor 5b.

At the subsequent moments $t_5$, $t_6$, the transistors 5b, 5e, and the power transistor 4 are rendered conductive and nonconductive responsive to the ignition signal $V_S$, and the discharge takes place successively at the ignition plug 7 in the same manner as mentioned earlier.

Figure 9:
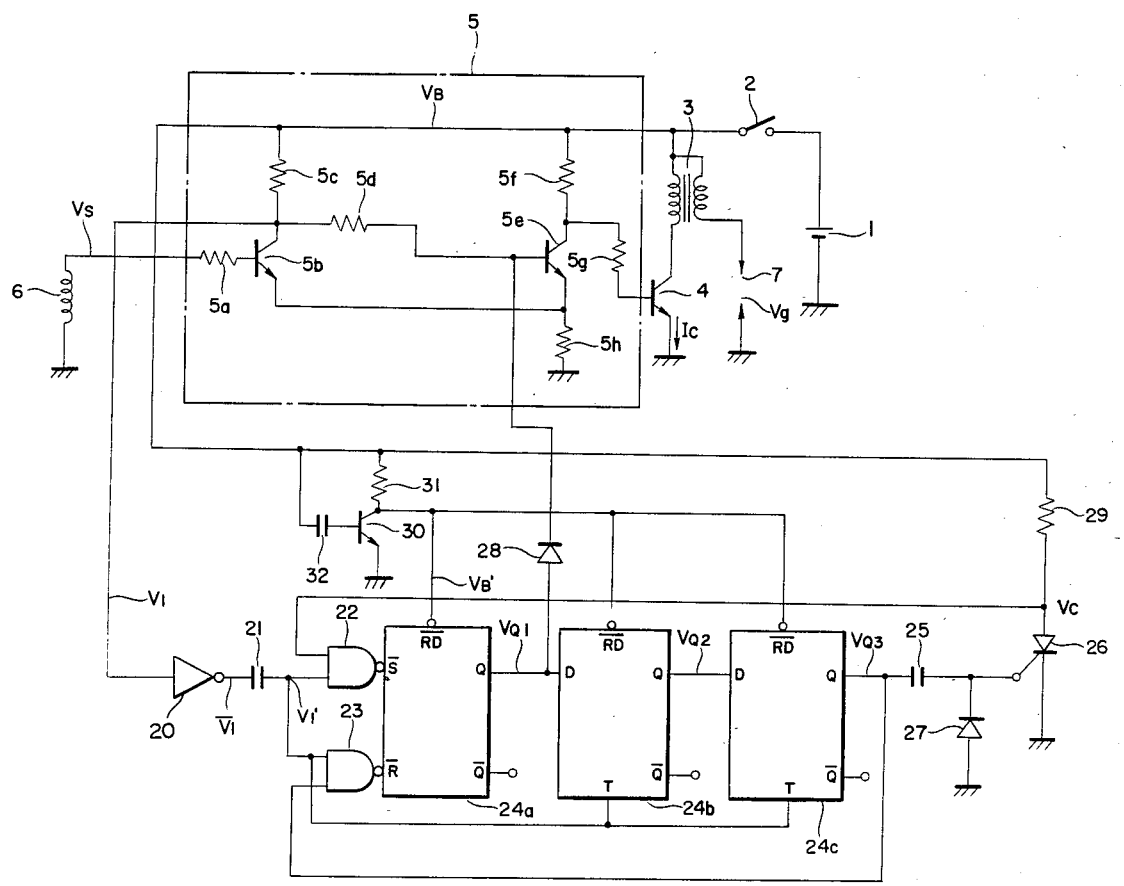
FIG. 9 is a circuit diagram of an ignition apparatus for internal combustion engines according to a fourth embodiment of the present invention.

A fourth embodiment of the invention will be described below. In FIG. 9, D type edge trigger flip-flop circuits 24b and 24c are newly provided, and are connected in cascade with respect to a flip-flop circuit 24a. The flip-flop circuit 24a is constructed in the same manner as the flip-flop circuit 24 that is shown in FIG. 7. That is, the output voltage $V_{Q1}$ of the flip-flop circuit 24a is input to the input terminal D of the flip-flop circuit 24b, the output voltage $V_{Q2}$ of the flip-flop circuit 24b is connected to the input terminal D of the next flip-flop circuit 24c, and the output voltage $V_{Q3}$ thereof is input to the thyristor 26 via the capacitor 25 and to the NAND gate 23 like in the aforementioned third embodiment.

Clock input terminals T of the flip-flop circuits 24b and 24c are served with the trigger voltage $V_1'$ from the capacitor 21. The circuit is constructed in the same manner as those of FIGS. 1 and 7 in other respects.

Figure 10:
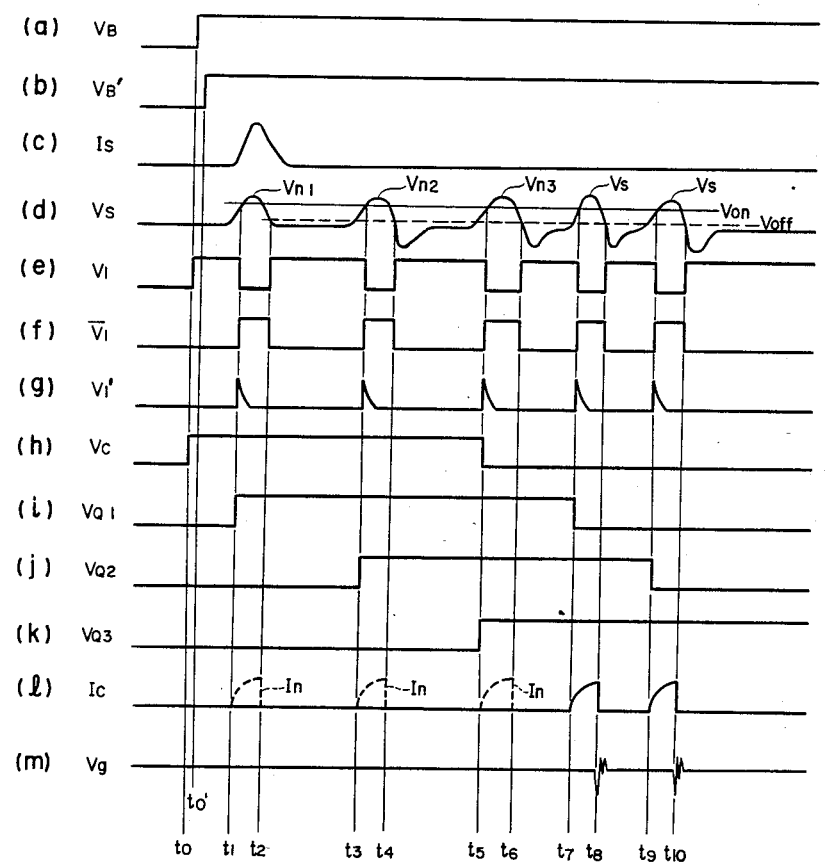
FIG. 10 is a diagram of wave forms for illustrating the operation of the ignition apparatus for internal combustion engines of FIG. 9.

FIG. 10 shows wave forms of voltages and currents at each of the portions of the circuit of FIG. 9. FIG. 10(a) shows the power source voltage $V_B$ applied to the signal processing circuit 5, FIG. 10(b) shows the output voltage $V_{B'}$ of the transistor 30, FIG. 10(c) shows the starter current $I_S$, FIG. 10(d) shows signal voltage $V_S$, FIG. 10(e) shows the output voltage $V_1$ of the transistor 5b, FIG. 10(f) shows the output voltage $\overline{V}_1$ of the inverter 20, FIG. 10(g) shows the differentiated output voltage $V_1'$ of the capacitor 21, FIG. 10(h) shows the anode voltage $V_C$ of the thyristor 26, FIG. 10(i) shows the output voltage $V_{Q1}$ of the flip-flop circuit 24a, FIG. 10(j) shows the output voltage $V_{Q2}$ of the flip-flop circuit 24b, FIG. 10(k) shows the output voltage $V_{Q3}$ of the flip-flop circuit 24c, FIG. 10(l) shows the collector current $I_C$ of the transistor 4, and FIG. 10(m) shows the discharge voltage Vg of the plug 7.

Operation of this fourth embodiment will be described below.

First, if the power source switch 2 is closed at a moment $t_0$, the power source voltage $V_B$ is supplied to the whole circuit, and the transistor 5b produces output voltage $V_1$ having a high level. Further, the flip-flop circuits 24a, 24b and 24c are reset, since an input signal of the low level is input to the reset terminals $\overline{RD}$ thereof due to the power source voltage $V_B$. Hence, the output terminals Q thereof assume a low level.

Next, it is presumed that the engine is rotated, and a plurality of noise voltages $Vn_1$ to $Vn_3$ are successively input as shown in FIG. 10(d) before a normal ignition signal $V_S$ is input to the signal generator coil 6. First, the flip-flop circuit 24a is set at a moment $t_1$ due to the fall edge of voltage $V_1$, and produces an output voltage $V_{Q1}$ having a high level.

At subsequent moments $t_3$ and $t_5$, the flip-flop circuits 24b and 24c are successively set in the same manner as described above, and produce output voltages $V_{Q2}$ and $V_{Q3}$ having high levels. Then, as the final output voltage $V_{Q3}$ of the high level is produced, the thyristor 26 is turned on as described earlier and produces an anode voltage $V_C$ having a low level. Therefore, the NAND gate 22 of flip-flop circuit 24a is closed, and the NAND gate 23 is opened. A first normal ignition signal $V_S$ is input at a moment $t_7$, and a trigger voltage $V_1'$ thereof is input to the flip-flop circuit 24a. Therefore, the flip-flop circuit 24a is reset and produces an output $V_{Q1}$ having a low level.

The output voltage $V_{Q1}$ of the flip-flop circuit 24a assumes a high level up to the above-mentioned moment $t_7$, and the transistor 5e is biased via the diode 28. Therefore, the transistor 5e is maintained conductive irrespective of the condition of the transistor 5b. Accordingly, the transistor 4 is not permitted to become conductive, and the collector current $I_C$ is not permitted to flow in a wave form as indicated by the dashed line In in FIG. 10(l).

As the flip-flop circuit 24a is reset as described above, and as the output voltage $V_{Q1}$ assumes a low level, the transistor 5e is controlled solely by the output of the transistor 5b.

Therefore, a normal ignition signal $V_S$ which is input next at the moment $t_7$ renders the transistor 5b conductive, the transistor 5e nonconductive, and the transistor 4 conductive, so that the coil current $I_C$ flows. Therefore, the normal ignition operation is carried out in the same manner as described above.

Output voltages $V_{Q2}$ and $V_{Q3}$ of the flip-flop circuits 24b and 24c successively drop to a low level as shown in FIGS. 10(j) and 10(k). As the output voltage $V_{Q3}$ assumes a low level, the NAND gate 23 connected to the input terminal R of the flip-flop circuit 24a is also closed. Therefore, the output voltage $V_{Q1}$ of the flip-flop circuit 24a is maintained (locked) at a low level thereafter (FIG. 10(i)).

In this embodiment, three flip-flop circuits 24a, 24b and 24c are used since there exist three noise voltages Vn. It will, however, be obvious that the object of the invention is accomplished if use is made of flip-flop circuits equal in number to the number of noise voltages Vn.

A fifth embodiment of an ignition apparatus for internal combustion engines according to the present invention will be described below in conjunction with the circuit diagram in FIG. 11.

Figure 11:
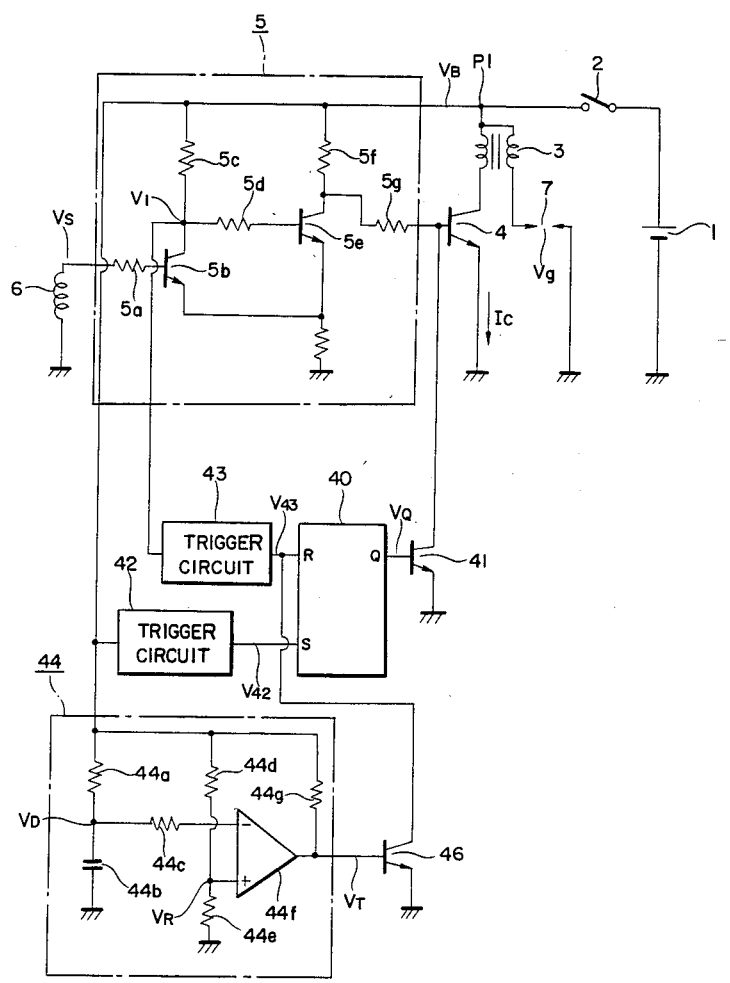
FIG. 11 is a circuit diagram of an ignition apparatus for internal combustion engines according to a fifth embodiment of the present invention.

As will be obvious from the comparison of FIG. 11 with FIG. 1, the portions denoted by reference numerals 1 to 7 of FIG. 11 are the same as those of FIG. 1, and the portions denoted by 8 and succeeding numerals are ones that are newly added to the construction of FIG. 1, and that make the characterizing feature of the embodiment.

The flip-flop circuit 40 has a set input terminal S and a reset input terminal R as well as an output terminal Q. The base of a transistor 41 is connected to the output terminal Q of the flip-flop circuit 40, the collector thereof is connected to the base of the power transistor 4, and the emitter thereof is grounded.

The output terminal of a trigger circuit 42 is connected to the set input terminal S of the flip-flop circuit 40, and the input terminal is connected to the positive pole of the DC power source 1 via the power source switch 2.

The output terminal of a trigger circuit 43 is connected to the reset input terminal R of the flip-flop circuit 40, and the input terminal thereof is connected to the collector of transistor 5b.

Furthermore, provision is made of a timer circuit 44 which chiefly consists of a comparator 44f, a resistor 44a and a capacitor 44b for setting a time constant. One end of a series circuit consisting of the transistor 44a and the capacitor 44b is connected to the positive pole of the DC power source 1 via the power source switch 2, and the other end thereof is grounded.

A connection point between the resistor 44a and the capacitor 44b is connected via a resistor 44c to the inverted input terminal (indicated with a minus sign) of the comparator 44f.

A series circuit consisting of a resistor 44d and a resistor 44e is connected in parallel with the series circuit consisting of the resistor 44a and the capacitor 44b. A connection point between the resistor 44d and the resistor 44e is connected to the noninverted input terminal (indicated with a plus sign) of the comparator 44f.

The output terminal of the comparator 44f is connected to a connection point between the resistor 44a and the power source switch 2, and is further connected to the base of a transistor 46. The emitter of the transistor 46 is grounded, and the collector thereof is connected to the reset input terminal R of the flip-flop circuit 40.

Figure 12:
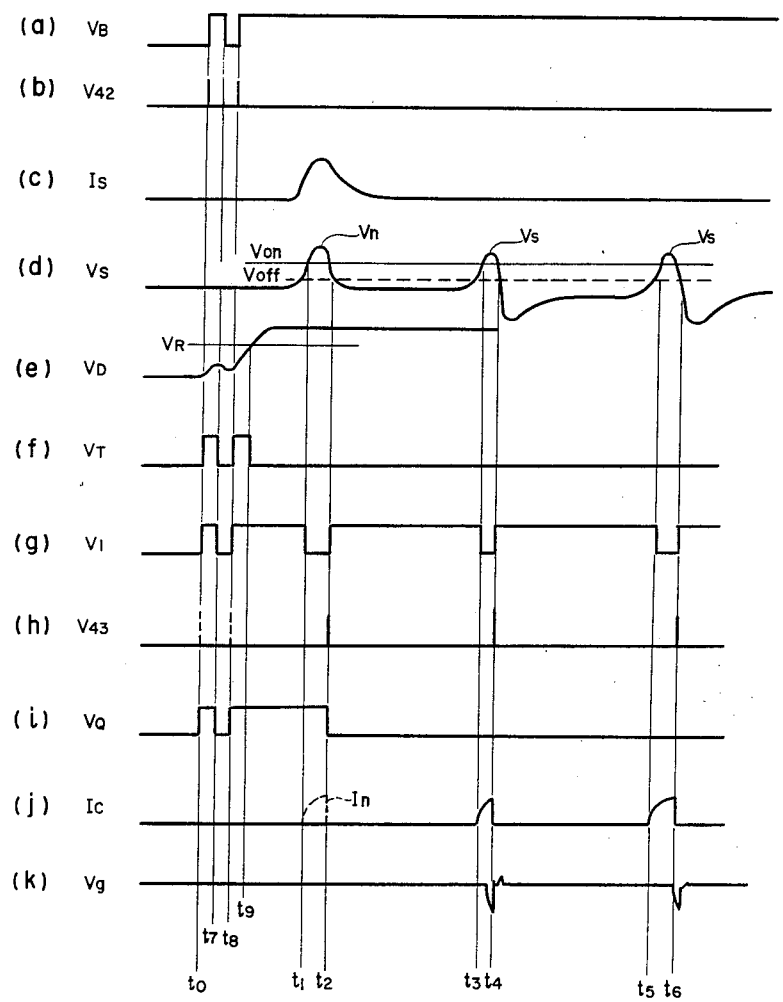
FIG. 12 is a diagram of wave forms for illustrating the operation of the ignition apparatus for internal combustion engines of FIG. 11.

Operation of the thus constructed ignition apparatus for internal combustion engines of the present invention will be described below in conjunction with FIG. 12, which is a time chart.

Similarly to FIG. 1, FIG. 12(a) shows the power source voltage $V_B$, FIG. 12(c) shows the starter current $I_S$, FIG. 12(d) shows the signal voltage $V_S$, FIG. 12(g) shows the output voltage $V_1$ of the transistor 5b, FIG. 12(f) shows the collector current $I_C$ of the power transistor 4, and FIG. 12(h) shows the discharge voltage Vg.

Symbol $V_{42}$ of FIG. 12(b) denotes the output voltage of the trigger circuit 42, symbol $V_{43}$ of FIG. 12(h) denotes the output voltage of the trigger circuit 43, symbols $V_D$ and $V_R$ of FIG. 12(e) denote the voltage of the capacitor 44b and the voltage of the noninverted input terminal of the comparator 44f, symbol $V_T$ of FIG. 12(f) denotes the output voltage of the timer circuit 44, and symbol $V_Q$ of FIG. 12(i) denotes the output voltage at the output terminal Q of the flip-flop circuit 40.

First, if the power source switch 2 is closed at a moment $t_0$, the power source voltage $V_B$ is applied to the whole circuit. In this case, if the power source switch 2 undergoes the chattering, the power source voltage $V_B$ of the circuit changes between a high level and a low level repetitively as shown in FIG. 12(a).

Although the level is changed only one time in this embodiment, the level in practice changes many times between a high level and a low level within a period of several milliseconds.

As the power source voltage $V_B$ rises, a short trigger pulse $V_{24}$ is generated by the trigger circuit 42 in synchronism with the rise. The trigger pulse $V_{42}$ is input to the set input terminal S of the flip-flop circuit 40 to set the flip-flop circuit 40. Therefore, the output voltage $V_Q$ at the output terminal Q assumes a high level to render the transistor 41 conductive. Hence, the base of the power transistor 4 assumes a low level, so that the power transistor 4 is maintained nonconductive.

At a moment $t_0$, the output voltage $V_1$ of the transistor 5b assumes a high level, and the trigger circuit 43 generates a trigger pulse $V_{43}$. The output voltage $V_1$ changes between a high level and a low level repetitively responsive to the chattering of the power source switch 2 as shown in FIG. 12(g). Therefore, trigger pulses $V_{43}$ are generated at moments $t_0$ and $t_8$.

Accordingly, the flip-flop circuit 40 is set and reset repetitively, and the output terminal Q of the flip-flop circuit is not reliably set, i.e., it does not reliably assume a high level at a moment when the chattering is finished.

The timer circuit 44 is provided in order to reliably operate the flip-flop circuit 40. Operation of the timer circuit 44 will be described below.

If the power source switch 2 is closed at a moment $t_0$, the terminal voltage of the capacitor 44b rises and becomes nearly equal to the power source voltage $V_B$ at some moment as indicated by a wave form of the voltage $V_D$ of FIG. 12(e).

The voltage $V_D$ of the capacitor 44b is input to the inverted input terminal of the comparator 44f, compared with the voltage $V_R$ at the noninverted input terminal, and the output voltage $V_T$ of the comparator 44f assumes a low level at a moment $t_9$ when the voltage $V_D$ exceeds the voltage $V_R$ (FIG. 12(f)). Referring to the wave form of the output voltage $V_T$, $V_D$ is smaller than $V_R$ during the period $t_0-t_7$ and $t_8-t_9$, and the voltage $V_T$ assumes a high level. During the period $t_7-t_8$, however, the power source voltage $V_B$ becomes zero, and the voltage $V_T$ assumes a low level.

Here, if the time from the moment the power source voltage $V_B$ is applied and the output voltage $V_T$ assumes a high level to the moment the transistor 46 is rendered conductive is selected to be shorter than the time from the moment the output voltage $V_1$ assumes a high level to the moment the trigger pulse $V_{43}$ is generated, it is possible to prevent the trigger pulse $V_{43}$ from being applied as reset input to the flip-flop circuit 40 until the moment $t_9$ at which the output voltage $V_T$ of the timer circuit 44 assumes a low level.

To produce the time difference mentioned above, the number of stages of transistors constituting the trigger circuit 43 should be selected to be larger than the number of output stages of the timer circuit 44.

Even when the chattering has developed in the power source switch 2, the timer circuit 44 operates to prevent undesired reset input, i.e., to prevent trigger pulse V₄₃ of the trigger circuit 43 from being input to the flip-flop circuit 40. Accordingly, the flip-flop circuit 40 is allowed to operate reliably.

Then, the starter current $I_S$ starts to flow near a moment $t_1$, whereby noise voltage Vn is contained in the ignition signal voltage $V_S$ as mentioned earlier. As the noise voltage Vn exceeds the turn-on voltage Von of the transistor 5b at the moment $t_1$, the transistor 5b is rendered conductive. Therefore, the transistor 5e is rendered nonconductive, and the base current is supplied to the power transistor 4.

At this moment $t_1$, however, the flip-flop circuit 40 is in a set condition, the output terminal Q of the flip-flop circuit 40 assumes a high level, and the transistor 41 is rendered conductive. Accordingly, the base current of the power transistor 4 flows entirely into the transistor 41, and the power transistor 4 is not rendered conductive.

At a moment $t_2$, furthermore, as the noise voltage Vn becomes smaller than the turn-off voltage Voff of the transistor 5b, the transistor 5b is rendered nonconductive, and the trigger circuit 43 generates a trigger pulse V₄₃. At this moment, the transistor 46 is maintained nonconductive due to the timer circuit 44. Hence, the flip-flop circuit 40 is reset, and the output voltage $V_Q$ at the output terminal Q thereof changes from a high level to a low level.

Thereafter, the power transistor 4 is rendered conductive and nonconductive responsive to normal ignition signal voltages $V_S$ generated near the moments $t_3$ and $t_5$, whereby the flow of current into the ignition coil 3 is controlled, a high voltage generates on the secondary side of the ignition coil 3 at moments $t_4$ and $t_6$, and spark develops at the ignition plug 7.

Further, the trigger pulse V₄₃ generates in response to the output voltage V₁ and is applied to the reset input terminal R of the flip-flop circuit 40. The voltage $V_Q$ at the output terminal Q of the flip-flop circuit 40, however, remains unchanged.

As will be obvious from the above description, the coil current In (indicated by a broken line in FIG. 12(j)) is extinguished by erroneous operation caused by noise voltage Vn that is induced by the starter current $I_S$. Hence, erroneous ignition does not take place.

Figure 13:
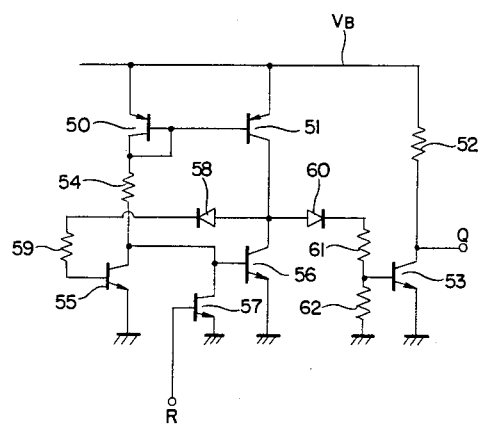
FIG. 13 is a circuit diagram showing a modified example which is equivalent to a flip-flop circuit employed in the ignition appratus for internal combustion engines of FIG. 11.

Although the above embodiment has dealt with the case where an R-S flip-flop was used as a flip-flop circuit 40, it is also allowable to use the circuit construction shown in FIG. 13 which exhibits the same function as the flip-flop circuit 40.

According to the circuit of FIG. 13, the voltage at the output terminal Q assumes a high level when the power source voltage $V_B$ is applied, without the need of providing the trigger circuit 42.

The circuit of FIG. 13 will be explained below.

In FIG. 13, the power source voltage $V_B$ is applied from the connection point P1 of FIG. 1 to the emitters of transistors 50, 51, and is further applied to the collector of transistor 53 via a resistor 52, the collector of transistor 53 being connected to an output terminal Q which corresponds to the output terminal Q of the flip-flop circuit 40 of FIG. 11.

The base and collector of transistor 50 are directly coupled together, and the collector is connected to the collector of transistor 55 via a resistor 54. The collector of transistor 55 is connected to the base of transistor 56 and to the collector of transistor 57.

Emitters of transistors 55, 57, 56 and 53 are grounded, and the trigger pulse V₄₃ of FIG. 11 is applied to the base of transistor 57 via a terminal R.

The collector of transistor 56 is connected to the base of transistor 55 via a diode 58 and a resistor 59, and is grounded via a diode 60 and resistors 61, 62, and is further connected to the collector of transistor 51. A connection point between resistor 61 and resistor 62 is connected to the base of transistor 53.

Operation of the circuit of FIG. 13 will be described below. As the DC power source 1 shown in FIG. 11 is applied, the electric current first flows through a path consisting of transistor 50 of which the base and collector are connected together, resistor 54, the base of transistor 56, and the emitter of transistor 56.

At this moment, it is presumed that the base of transistor 57 or the terminal R remains at ground potential. Therefore, the transistor 57 is nonconductive, the transistor 56 is conductive, and the collector current of the transistor 51 all flows into the transistor 56. Thus, the transistor 53 is not provided with a base current and remains nonconductive, so that the output terminal Q assumes the high level.

Then, as the trigger pulse V₄₃ is applied from the trigger circuit 43 to the terminal R, the transistor 57 is rendered conductive and no base current is supplied to the transistor 56. Therefore, the transistor 56 is rendered nonconductive, and the collector current of the transistor 51 is supplied to the base of transistor 55 via the diode 58 and resistor 59, and is further supplied to the base of transistor 53 via the diode 60 and resistor 61. Hence, the two transistors 55 and 53 are rendered conductive.

Here, even when the trigger pulse V₄₃ is no longer applied and the transistor 57 is rendered nonconductive, the transistor 55 remains conductive. Therefore, the transistor 53 is maintained conductive without rendering the transistor 56 conductive.

As described above, the condition where the transistor 53 is rendered nonconductive corresponds to the set condition of the flip-flop circuit 40, and the condition where the transistor 53 is rendered conductive corresponds to the reset condition of the flip-flop circuit 40. Thus, the circuit of FIG. 13 exhibits the function of flip-flop circuit 40 without the need of using the aforementioned trigger circuit 42.

According to the embodiments described above, the circuit is constructed so as to respond to a plurality of noise voltages introduced in succession.

The above-mentioned embodiments have dealt with the cases of a so-called current interrupt type in which the primary current flowing into the ignition coil 3 is interrupted by the transistor 4. It will, however, be obvious that the invention can also be adapted to a so-called capacitor discharge type in which a DC high voltage built up in a capacitor is discharged into the ignition coil through a thyristor, by simply connecting the thyristor in place of the transistor 4.

According to the present invention as described above, the ignition apparatus is prevented from being erroneously operated by noise induced by the starter current at the time of starting the engine. Further, even when chattering develops in the power source switch, the ignition apparatus operates reliably.

What is claimed is:

1. An ignition apparatus for internal combustion engines comprising:

means for generating an ignition signal synchronizing with an engine speed;

a circuit, formed of first and second amplifying stages, for processing the wave form of the output signal of said ignition signal generating means;

a switching circuit driven by the output signal of said second stage of said wave form processing circuit to induce a discharging voltage across an ignition coil;

a DC power source for supplying power to said wave form processing circuit and said switching circuit; and, a bistable means set by said DC power source voltage and reset by the output of said first stage of said wave form processing circuit, said bistable means holding said reset state and controlling said second stage so as not to induce the discharging voltage across said ignition coil, at least during the time interval of said set and reset operations.

2. An ignition apparatus for internal combustion engines according to claim 1 wherein said wave form processing circuit comprises a Schmitt circuit formed of first and second transistor amplifier stages, and said bistable means comprises an R-S flip-flop whose reset terminal is connected to the output of said first transistor stage, whose set terminal is connected to said DC power source, and whose output terminal is connected to the input of said second transistor stage, the outputs of said both stages being, connected to said DC power source.

3. An ignition apparatus for internal combustion engines according to claim 2, further comprising a delay circuit connected between said DC power source and the set terminal of said flip-flop so that the set signal is necessarily inputted to said flip-flop after the reset signal.

4. An ignition apparatus for internal combustion engines according to claim 2, further comprising a plurality of D type flip-flop in the form of a cascade connection and a delay circuit, the trigger terminals of said D type flip-flop being commonly connected to said DC power source, said delay circuit being inserted between the set terminal of said R-S flip-flop and the input of the first D type flip-flop, and the output of the last D type flip-flop being connected to the reset terminal of said R-S flip-flop, whereby input noises, from said signal generating means, having the number of occurrences corresponding to the number of said plurality of D type flip-flops can not affect said second transistor stage of said Schmitt circuit.

5. An ignition apparatus for internal combustion engines according to claim 4 wherein said ignition signal generating means comprises a signal coil connected to the input of said first transistor stage of said Schmitt circuit, and said switching circut comprises a transistor whose base is connected to the output of said second transistor stage, whose emitter is grounded, and whose collector is connected through the primary winding of said ignition coil to said DC power source, the secondary winding of said ignition coil being serially connected to an ignition plug, said ignition apparatus further comprising a power switch for closing/opening said DC power source.

6. An ignition apparatus for internal combustion engines comprising:

means for generating an ignition signal synchronizing with an engine speed;

a circuit, formed of first and second amplifying stages, for processing the wave form of the output signal of said ignition signal generating means;

a switching circuit driven by the output signal of said second stage of the wave form processing circuit to induce a discharging voltage across an ignition coil;

a DC power source for supplying power to said wave form processing circuit and said switching circuit; and, a bistable means set by the first one of output signals of said first stage of said wave form processing circuit and reset by any one of the subsequent output signals of said first stage, said bistable means including means for holding said reset state and controlling said second stage of said wave form processing circuit so as not to induce the discharging voltage across the ignition coil, at least during the time interval of said set and reset operations.

7. An ignition apparatus for internal combustion engines according to claim 6 wherein said waveform processing circuit comprises a Schmitt circuit formed of first and second transistor amplifier stages.

8. An ignition apparatus for internal combustion engines according to claim 7 wherein said bistable means includes an R-S flip-flop, said holding means includes a circuit for overriding input signals from said first stage of said Schmitt circuit to said flip-flop after said reset state, and said controlling means includes a circuit for connecting the ouptut of said flip-flop to the input of said second stage of said Schmitt circuit so that second stage is biased by the energized output of said flip-flop.

9. An ignition apparatus for internal combustion engines according to claim 8 wherein said overriding circuit includes first and second NAND gates respectively connected to the set and reset terminals of said flip-flop, an inverter connected to the output of said first stage of said Schmitt circuit, a capacitor connected between the output of said inverter and one input of said first NAND gate as well as one input of said second NAND gate, and a switching element whose anode is connected to said DC power source through a power switch and to the other input of said first NAND gate, whose cathode is grounded, and whose gate is connected through a capacitor to the output of said flip-flop, to the input of said second stage, and to the other input of said second NAND gate.

10. An ignition apparatus for internal combustion engines according to claim 9, further comprising a transistor whose collector is connected to said DC power source through the power switch and a clear terminal of said R-S flip-flop, whose emitter is grounded, and whose base is connected through a capacitor to said collector.

11. An ignition apparatus for internal combustion engines according to claim 10, further comprising a plurality of D type flip-flops in the form of a cascade connection, inserted between the output of said R-S flip-flop and the capacitor connected to the anode of said switching element, the trigger terminals of said D type flip-flops being commonly connected to the junction of the capacitors connected to said inverter and the input terminals of said NAND gates, and the clear terminals of said D type flip-flop being commonly connected to the collector of said transistor.

12. An ignition apparatus for internal combustion engines according to claim 1, further comprising a timer means for timing a predetermined time interval, from the moment of the application of said DC power source voltage, for which said bistable means is not reset.

13. An ignition apparatus for internal combustion engines according to claim 12, further comprising first and second trigger circuits respectively inserted between the DC power source and the set terminal and between the output of said first stage of said waveform processing circuit and the reset terminal of said bistable means, and a transistor whose base connected to the output of said bistable means, whose emitter is grounded, and whose collector is connected to the input of said second stage of said wave form processing circuit.

14. An ignition apparatus for internal combustion engines according to claim 13, wherein said bistable means comprises an R-S flip-flop, and said timer means comprises a comparator whose inverting input terminal is connected to a capacitor connected to said DC power source, whose non-inverting input terminal connected to a voltage divider connected across said DC power source, and whose output is connected to the base of a transistor the collector of which is connected to the reset terminal of said R-S flip-flop and the emitter of which is grounded.

15. An ignition apparatus for internal combustion engines according to claim 1, further comprising a trigger circuit inserted between the reset terminal of said bistable means and the output of said first stage of said waveform processing circuit, a transistor whose base is connected to the output of said bistable means, whose emitter is grounded, and whose collector is connected to the input of said second stage of said waveform processing circuit, and a timer means for timing a predetermined time interval, from the moment of the application of said DC power source voltage, for which said bistable means is not reset, said bistable means comprising first to sixth transistors, the emitters of the first and second transistors being commonly connected to said DC power source, the bases thereof being connected to each other, the base and the collector of said first transistor being connected to each other, the collectors of the third and fourth transistors being commonly connected to the collector of said first transistor as well as the base of said fifth transistor whose collector is connected to the collector of said second transistor as well as the bases of said third and sixth transistors through respective forward directed diodes, the collector of said sixth transistor being connected to said DC power source and forming the output of said bistable means, and the emitters of said third to sixth transistors being grounded, the base of said fourth transistor forming the reset terminal of said bistable means.

* * * * *